United States Patent Office 3,160,632
Patented Dec. 8, 1964

3,160,632
AMINOMETHYLENEPHOSPHINIC ACIDS, SALTS THEREOF, AND PROCESS FOR THEIR PRODUCTION
Arthur Dock Fon Toy, Park Forest, and Eugene H. Uhing, Chicago, Ill., assignors to Stauffer Chemical Company, New York, N.Y., a corporation of Delaware
No Drawing. Filed Jan. 30, 1961, Ser. No. 85,493
17 Claims. (Cl. 260—268)

The present invention relates to aminomethylene-phosphinic acids, salts thereof and the process of producing such compounds by reacting chloromethylphosphinic acid, or salts thereof, with ammonia, organic primary and secondary amines in the presence of a base.

The new aminomethylenephosphinic acid compounds have the general formula:

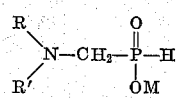

wherein R is from the group consisting of hydrogen, alkyl, aryl, alkaryl, hydroxyalkyl, and

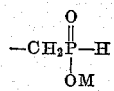

radicals, R' is from the group consisting of R, alkylene-NRR', arylene-NRR' and heterocyclic alkylene-NRR' radicals, and M represents hydrogen and salt-forming cations.

The new compounds have a wide variety of uses such as chelating agents, wetting agents, biologically active compounds and as chemical intermediates for the production of aminomethylenephosphonic acids and derivatives thereof.

In the process of producing the new compounds, the first step is to neutralize the chloromethylphosphinic acid with the appropriate amine or metal bases to form the salts and then react the salt with the appropriate amine in the presence of excess amine or other base. In general, the reaction may be carried out in one step by simply using sufficient amine or other base to form the salt and effect the reaction without initial separation of the salt. However, it is satisfactory and sometimes desirable to start with an amine or alkali base salt of chloromethylphosphinic acid and carry out the second stage reaction with the desired primary or secondary amine. With an easily volatilized amine compound, such as ammonia which is capable of forming bis and tris-methylenephosphinic type products, it is generally preferred to first prepare the amino mono-methylenephosphinic compound and then react this compound with additional amounts of the chloromethylphosphinic acid salts to form the bis and tris-methylenephosphinic derivatives.

The general reaction which takes place may be illustrated by the following selected typical equations:

(a)
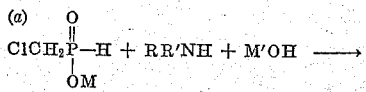

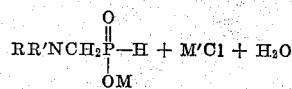

(b)
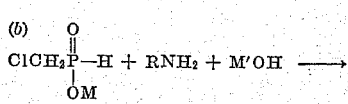

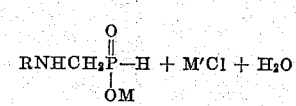

(c)
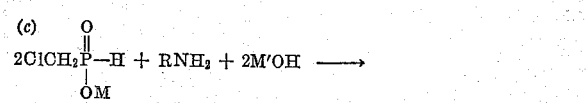

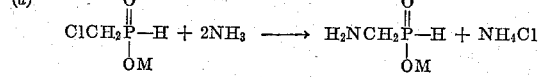

(d)
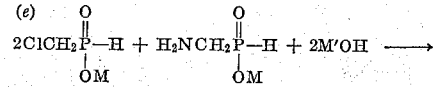

(e)
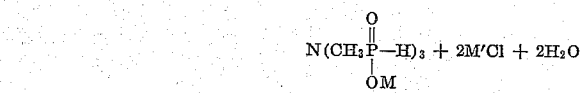

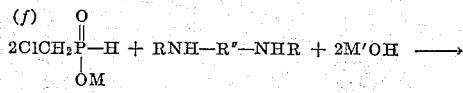

(f)
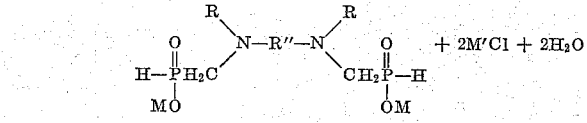

R and R' in the above typical equations are the same as shown in the above product formula, and M and M' are the same or different salt-forming cations, and R'' is an alkylene, arylene, or cycloalkylene radical.

The products of the above equations are shown in their salt forms. Where desired, the free methylenephosphinic acids may be obtained by reacting the salts with a strong acid, such as hydrochloric acid and separating the acid product from the reaction mixture.

The reaction is quite general and proceeds with a large number and variety of organic primary and secondary amines as well as ammonia and ammonium compounds. Typical organic amino compounds which we have found suitable for use in the process may be illustrated by the following general types:

Mono and dialkyl amines (1–18 C atoms)
Mono and diaryl amines
Alkylene di and polyamines
Phenylene diamines
Heterocyclic primary and secondary amines
Substituted alkyl primary and secondary amines
Substituted aryl primary and secondary amines It has now been found that the above type primary and secondary amines readily react with chloromethylphosphinic acid and salts in aqueous alkaline solutions with release of hydrochloric acid and the formation of the aminomethylenephosphinic acid derivatives. In carrying out the reaction sufficient alkalinity must be present to neutralize the acidity of the chloromethylphosphinic acid and absorb the hydrochloric acid liberated by the reaction. In general, an excess of the alkaline base may be employed to drive the reaction to completion. The base may be an excess of the amine with which the desired reaction is to be carried out, but preferably the alkalinity may be obtained by the use of cheaper alkalies such as caustic soda.

The chloromethylphosphinic acid starting material may be prepared in accordance with the method described in U.S. patent application (Serial No. 65,018, filed Oct. 26, 1960) which comprises hydrolyzing chloromethylphosphonous chloride with water and removing the by-product, HCl, by vacuum.

In all of the following examples, it is preferred to carry out the reactions under non-oxidizing conditions, suitably in an atmosphere of nitrogen to avoid partial oxidation of the phosphinic radical.

*Example 1.—Aminomethylenephosphinic Acid*

In a typical example of the present invention, 34.2 grams of chloromethylphosphinic acid was placed in a reaction flask under an atmosphere of nitrogen. Then 225 ml. of water and 250 ml. of concentrated $NH_4OH$ was added and the reaction mixture heated for five hours under refluxing conditions at 75°–95° C. The mixture was then evaporated to dryness. The product was dissolved in water and silver oxide added to precipitate the $Cl^-$. After filtering off the silver chloride the aqueous solution was evaporated to dryness giving 26 grams (91% yield) of product. The product analyzed 31.2% P, 15.4% N. On recrystallization from water by adding ethanol, the product analyzed 32.7% P, 14.7% N, corresponding to the theoretical values for aminomethylenephosphinic acid ($H_2NCH_2PO_2H_2$). The aminomethylenephosphinic acid was an excellent nematocide when sprayed at 27 parts per million solution on soil infected with root knot nematodes. The test soil was held in sealed container for 48 hours. Tomato plants were then transplanted in the test soil. After three weeks the plant roots were examined. Results showed 100% nematode control.

The product also showed 100% control as a soil fungicide against *Fusarium solani* infected pinto bean plants at 110 p.p.m. concentration of the aminomethylenephosphinic acid.

*Example 2.—Aminodimethylenephosphinic Acid*

In a 500 ml. reaction flask was placed 14.5 grams (0.152 mole) of the aminomethylenephosphinic acid from Example 1, 17.5 grams (0.153 mole) of chloromethylphosphinic acid, and 35 ml. of water. Thirty ml. of 10 N $^-$ NaOH (0.3 mole) was added and the reaction mixture heated to 100° C. for four hours and kept basic during this time by adding 15 ml. of 10 N NaOH (0.15 mole) as the reaction proceeded. The reaction mixture was cooled and acidified with 0.3 mole of HCl, and then evaporated to dryness. This product was extracted with 200 ml. of concentrated HCl and the product separated by filtration from the residual NaCl. The filtrate was treated with silver oxide to precipitate the remaining chlorine ions. After filtering, the solution was evaporated to dryness yielding 24.4 grams (92% yield) of an acid product having 33.8% P, 8.3% N, and corresponding to 35.8% P and 8.1% N, the theoretical values for the aminodimethylenephosphinic acid

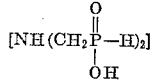

The above product is useful as an intermediate for the production of the corresponding phosphonic acid derivative. For example, 12.2 grams of the above product was oxidized with 85 grams of mercuric chloride in 200 ml. of water by heating for two hours at 100° C. The precipitated HgCl was filtered off and the excess $HgCl_2$ precipitated by treatment with $H_2S$. The solution was again filtered. Chlorine ions were removed by treatment with silver oxide. The filtrate was evaporated to dryness yielding 14.7 grams (94% yield) of the aminodimethylenephosphonic acid. Analysis showed 29.0% P, and 7.3% N compared with theoretical values of 30.3% P and 6.83% N.

*Example 3.—N,N,N-Tris-(Methylenephosphinic Acid)-Amine*

In a similar manner chloromethylphosphinic acid was reacted with an excess of an aqueous solution of concentrated $NH_4OH$, and then treated with an excess of sodium hydroxide to remove the excess ammonium hydroxide. The crude reaction mixture was evaporated to dryness and then further reacted in aqueous NaOH solution with two equivalents of chloromethylphosphinic acid to form the sodium salt of the N,N,N-tris-(methylenephosphinic acid)-amine. The reaction mixture was acidified with HCl and evaporated to dryness, then separated from the NaCl formed by extracting with concentrated HCl. The HCl extract was then evaporated to remove the HCl yielding the free N,N,N-tris-(methylenephosphinic acid)-amine in 87.5% yield. The product contained 37.2% P, 5.6% N compared to theoretical values of 37.1% and 5.56% respectively. This product is useful for the chelation of ferric ions in dilute aqueous solutions at pH values of 9 to 11. At a pH of 9.0, one mole of the compound will chelate ¼ mole of calcium ions in the presence of oxalate ions.

The product also is valuable as an intermediate for the production of N,N,N-tris-(methylenephosphonic acid)-amine, a compound having excellent chelating capacity for metal ions such as calcium and ferric iron. For example, the N,N,N-tris-(methylenephosphinic acid)-amine was oxidized with mercuric chloride to give a quantitative yield of N,N,N-tris-(methylenephosphonic acid)-amine having excellent chelating power for alkaline earth and heavy metal ions. For instance, at pH of 9.0, one mole will hold 2 equivalents of calcium ions in solution in an aqueous sodium oxalate solution, and 3 equivalents of ferric ions in an aqueous solution of sodium hydroxide at pH 9.0, compared to not more than one equivalent of such ions when using the well-known ethylenediaminetetraacetic acid (EDTA) chelating agent.

*Example 4.—Laurylaminomethylenephosphinic Acid*

Laurylaminomethylenephosphinic acid was prepared by reacting laurylamine and chloromethylphosphinic acid in an aqueous solution of caustic soda in accordance with the equation:

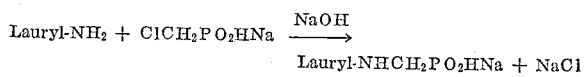

In a reaction flask was placed 0.6 mole of lauryl amine, and 34.2 grams (0.3 mole) of chloromethylphosphinic acid added with 50 ml. of water. The mixture was neutralized with 0.3 mole of caustic soda and the mixture heated to 100° C. and kept alkaline during the reaction by the addition of 50 ml. of 6 N NaOH solution. The reaction mixture was then evaporated to dryness and any unreacted amine removed by extraction with ethyl ether. The reaction product was placed in water and 0.3 mole of HCl added. The solid reaction product was then removed by filtering to give 66 grams (84% yield) of substantially pure laurylaminomethylenephosphinic acid, having a neutralizing value of 264 compared to a theoretical value of 263.

The product is an excellent wetting agent having a Draves sinking time value of 15 seconds at a pH of 10.0 and 0.05% concentration compared to a sinking time of 135 seconds for a commercial alkyl aryl sulfonate (Oronite D–40) wetting agent.

The Draves sinking time test is carried out in accordance with the "Draves" method described in Amer. Assoc. Textile Chem. Colorists Year Book, p. 162 (1935–6). The test comprises the determination of the time required for a 5.0 gram skein of two-ply unboiled cotton yarn to sink when weighted with a 1.5 gram sinker and submerged in the wetting agent solution by means of an anchor.

*Example 5.—Laurylamine-Bis-Methylenephosphinic Acid*

In a 1 liter, 3 neck reaction flask equipped with stirrer, reflux condenser and buret there was placed 46.2 grams (0.25 mole) of laurylamine, and 85 grams (0.75 mole)

of chloromethylphosphinic acid, and 50 ml. of water added as a solvent. The reaction mixture was made basic by the addition of 0.75 mole of NaOH dissolved in 30 ml. of water. The reaction mixture was then warmed to 70°–80° C. to effect reaction. In order to keep the reaction alkaline, 2 ml. of 12 N NaOH was added every 15 minutes until a total of 0.85 mole NaOH had been introduced. The reaction product was then made acid by the addition of 0.85 mole concentrated HCl. Then calcium acetate was added to precipitate the calcium salt of the product. This salt was then treated with HCl to remove the calcium and give the free lauryl amine-bis-methylenephosphinic acid in a 73% yield. Analysis of the product showed 15.1% P, 3.7% N compared to theoretical values of 18.2% and 4.1%.

The product was a fair wetting agent having a Draves sinking time value of 42 minutes.

*Example 6.—Stearylaminomethylenephosphinic Acid*

An aqueous suspension of stearyl amine was reacted with chloromethylphosphinic acid in an aqueous NaOH solution. After warming for several hours the reaction product was evaporated to dryness and the unreacted amine extracted with ethyl ether. The product was then neutralized with HCl, and the sodium chloride formed was removed by washing with water. The crude stearylaminomethylenephosphinic acid product was recovered in 95% yield having a purity of about 90%. The product had fair wetting out characteristics though somewhat inferior to the laurylaminomethylenephosphinic compounds shown in the previous examples above.

*Example 7.—Phenylaminomethylenephosphinic Acid*

Two-tenths mole of chloromethylphosphinic acid was mixed with 180 grams of aniline in a reaction flask and heated at 100°–120° C. for 3 hours. The excess aniline was evaporated off and recovered. Caustic soda was then added to convert the aniline salt to the sodium salt, and the liberated aniline extracted with ethyl ether. The residual product was dissolved in water and HCl added to precipitate out the free phenylaminomethylenephosphinic acid in a crude yield of 96%. On recrystallization from hot water the product had an analysis of 18.4% P, 7.4% N compared to theoretical values of 18.1% P and 8.1% N. It had a theoretical neutralizing equivalent of 171.

*Example 8.—o-Tolylaminomethylenephosphinic Acid*

Chloromethylphosphinic acid was reacted with o-toluidine in an excess of o-toluidine as a solvent for 3 hours at 100°–120° C. The excess o-toluidine was evaporated, and the reaction product made basic with caustic soda. The product was then extracted with ethyl ether, and treated with HCl to form the free acid. The acid product was then crystallized in 84% yield from water. It had a neutralizing equivalent of 184, and P content of 17.0%, compared to 185.2 and 16.75% theory for the formula

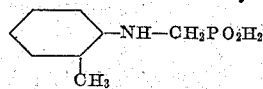

*Example 9.—Ethylenediamine-Tetramethylenephosphinic Acid*

Four moles of the sodium salt of chloromethylphosphinic acid and 1 mole of ethylenediamine were placed in a reaction flask in an aqueous solution of four moles of NaOH. The mixture was heated to 80°–100° C. for 3 hours while maintaining an excess of NaOH by periodic additions during the reaction. The reaction proceeded in accordance with the equation:

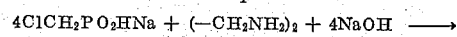

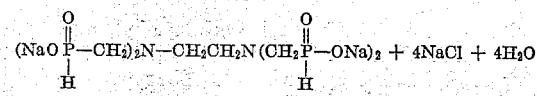

The reaction mixture was then acidified with excess concentrated HCl in sufficient amount to extract the product from the NaCl formed. The extract was then evaporated down to remove the HCl solvent and the last traces of chlorine, removed by precipitation with silver oxide. On evaporation to dryness the free product was recovered in a 93% yield. Analysis showed 32.0% P, 6.7% N and neutralizing equivalent of 93 compared with theoretical values of 33.4% P, 7.5% N and 93.1 neutralizing equivalent. The product is useful as a chelating agent, for example, at pH 9.0, one mole of the tetrasodium salt was capable of holding one-fourth mole of calcium in solution in the presence of oxalate ions.

The above phosphinic acid product is suitable as an intermediate for the preparation of the corresponding phosphonic acid. For example, the ethylenediamine tetramethylenephosphinic acid in aqueous solution was oxidized with mercuric chloride to form the corresponding phosphonic acid. Mercurous chloride was filtered off and the filtrate evaporated to dryness giving a 95% yield of ethylenediamine tetramethylenephosphonic acid (29.2% P, 7.3% N compared to 28.4% P, 6.4% N for theory). This product was capable of chelating one-half mole of calcium in the presence of oxalate ions at pH of 9.0 and two-thirds mole of ferric iron in the presence of hydroxyl ions at pH of 12.0.

*Example 10.—p-Phenylenediamine Tetramethylenephosphinic Acid*

In a similar manner, four moles of chloromethylphosphinic acid and one mole of p-phenylenediamine were reacted together in an aqueous solution of excess caustic soda to give a 95% yield of p-phenylenediamine tetramethylenephosphinic acid in the form of a heavy syrup. The product was capable of chelating calcium ions at pH 9.0 in the presence of oxalate ions.

*Example 11.—m-Phenylenediamine Tetramethylenephosphinic Acid*

In a similar manner, m-phenylenediamine was reacted with four equivalents of chloromethylphosphinic acid to give a product capable of chelating calcium on a mole for mole basis at pH 9.0 in the presence of oxalate ions.

*Example 12.—Piperazine Di-Methylenephosphinic Acid*

Piperazine was reacted in aqueous medium with two mole equivalents of chloromethylphosphinic acid and four mole equivalents of NaOH at a temperature of about 100° C. while maintaining the alkalinity by incremental additions of NaOH during the reaction period of about 3 to 4 hours. The reaction mixture was then made acidic with HCl and evaporated to dryness, and the product separated from the NaCl formed and extracted with concentrated HCl to give a 97% yield of an acid product of the formula:

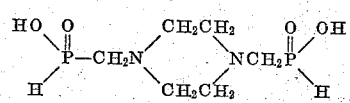

This product was capable of chelating calcium ions on a mole for mole basis at a pH of 9.0 in the presence of oxalate ions. The product showed from 25% to 50% control of rust and mildew on infected pinto beans when sprayed with a 1000 p.p.m. solution of the product.

*Example 13.—Hydroxyethylamino-Methylenephosphinic Acid*

Chloromethylphosphinic acid may be reacted with an excess of monoethanolamine to form the ethanolamine salt of hydroxyethylaminomethylenephosphinic acid in accordance with the following equation:

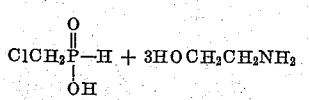

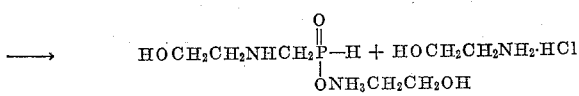

$$\longrightarrow \underset{\underset{ONH_3CH_2CH_2OH}{|}}{HOCH_2CH_2NHCH_2\overset{O}{\overset{\|}{P}}-H} + HOCH_2CH_2NH_2 \cdot HCl$$

The salt may be converted to the free acid by reacting with concentrated HCl and removing the amine hydrochloride formed.

*Example 14.—Glycine-Methylenephosphinic Acid*

In a 3-neck reaction flask fitted with stirrer, reflux condenser and dropping buret, was placed 22.5 grams of glycine (0.3 mole), 34.2 grams (0.3 mole) of chloromethylphosphinic acid, and 24.0 grams (0.6 mole) of NaOH with 150 ml. of water as solvent. The mixture was refluxed at 100° C. for several hours while keeping the reaction mixture alkaline by adding increments of 6 N NaOH solution until 0.21 mole of NaOH was added. The reaction mixture was then acidified by the addition of 0.52 mole of HCl and evaporated to dryness. The product (95.2 grams) was placed in 130 ml. of cold water to disolve the NaCl formed, and the glycine-methylenephosphinic acid product allowed to crystallize out. Thirty-nine grams (85% yield) of the crystalline product was recovered. After recrystallization from hot water the product analyzed 19.8% P, 9.3% N compared to 20.2% P and 9.15% N, theoretical for the formula

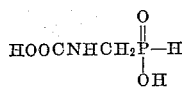

$$\underset{\underset{OH}{|}}{HOOCNHCH_2\overset{O}{\overset{\|}{P}}-H}$$

The product converted to the corresponding phosphonic acid derivative. 3.47 grams (0.027 mole) of the above recrystallized product and 12.5 grams (0.046 mole) HgCl$_2$ and 100 ml. water were placed in a reaction flask and heated at reflux temperature for 2 hours. The HgCl was then filtered off and the excess HgCl$_2$ removed by treatment with H$_2$S and filtering off the precipitated HgS. The filtrate was evaporated to dryness. The chlorine ion present (0.013 mole) was neutralized with 0.013 mole NaOH in 20 ml. of water. The product was filtered cold and washed with 5 ml. of cold water giving 3.6 grams (94% yield) of the glycine-methylenephosphonic acid product having an analysis of 18.6% P, 8.9% N and no Cl$^-$ compared to theoretical values of 18.3% P and 8.3% N.

While it is generally preferable to carry out the reactions of this invention in basic aqueous solution, it is possible, and sometimes desirable to react the chloromethylphosphinic acid with an excess of the primary or secondary amine reactant under non-aqueous conditions.

Somewhat higher temperatures are required under non-aqueous conditions to promote the reactions. Temperatures in the order of 130°–150° C. are generally satisfactory. With the lower boiling amines such as anhydrous ammonia, the lower alkyl amines and the like, the reactions may be carried out under pressure in order to maintain a satisfactory reaction temperature.

With the higher boiling amines the reaction proceeds satisfactorily under atmospheric pressure, for example.

*Example 15.—Cyclohexylaminomethylenephosphinic Acid*

In a reaction flask equipped with a reflux condenser was placed 20.5 grams (0.206 mole) of cyclohexylamine and 3.42 grams (0.03 mole) of chloromethylphosphinic acid. While maintaining the reactants under nitrogen (non-oxidizing atmosphere) they were heated under reflux for 4 hours at about 120° C. and then for 2 hours at about 140° C. The reflux condenser was removed and the excess amine removed by evaporation to give the amine salt of the reaction product together with the aminehydrochloride formed. This product was then treated with 0.06 mole NaOH in 50 ml. of water. The product was heated to vaporize off the liberated amine. The product was treated with 0.03 mole concentrated HCl, evaporated to dryness and then extracted with hot ethanol to separate the product from the sodium chloride residue. The excess ethanol was then evaporated off, and the product recrystallized from an aqueous ethyl alcohol solution. A 52.2% yield of the cyclohexylaminomethylenephosphinic acid was obtained having an analysis of 17.0% P, 7.8% N compared to the theoretical values of 17.49% P and 7.8% N for the formula:

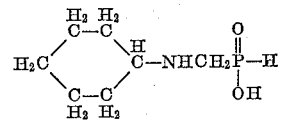

*Example 16.—Heptylaminomethylenephosphinic Acid*

In a manner similar to that of Example 15, 25 ml. of heptylamine was reacted with 3.42 grams of chloromethylphosphinic acid to give a 55% yield of the heptylaminomethylenephosphinic acid.

*Example 17.—Dibutylaminomethylenephosphinic Acid*

In a similar manner, 25 ml. of n-butylamine was reacted with 3.42 grams of chloromethylphosphinic acid under refluxing conditions for 4 hours at 120° C. and 2 hours at 140° C. After removal of the excess amine, the product was treated with a solution of NaOH, and the sodium salt of the dibutylaminomethylenephosphinic acid was recovered in 82.5% yield.

In utilizing any of the above aminomethylenephosphinic compounds as intermediates for the production of the corresponding phosphonic derivatives, it is only necessary to oxidize the phosphinic group. The oxidation reaction may be effected by use of any suitable oxidizing agent, such as mercuric chloride, hydrogen peroxide, nitric acid, oxygen, etc. For convenience, mercuric chloride has been employed in the above illustrated examples.

In determining the chelating characteristics of some of the above compounds, the following test procedures were employed.

For calcium ions, a 0.01 molar solution of calcium chloride was added to a 0.01 molar solution of sodium oxalate and the compound to be tested until a calcium oxalate precipitated out on standing overnight and determining the amount of calcium ions held in solution.

For ferric ions, the amount of 0.01 molar solution of ferric chloride required to cause precipitation of ferric hydroxide in a 0.01 molar solution of the compound to be tested, when held at 100° C. for 6 hours, was determined and the ferric ions held in solution calculated.

In the above examples, various amine and alkali metal salts have been produced in reaction procedure and obviously, may be recovered as such prior to their conversion to the free acids. The free acids additionally may be neutralized by various amine and metal bases to produce a wide variety of aminomethylenephosphinate salts.

The foregoing description is given for clearness of understanding only and no unnecessary limitations should be understood therefrom, as modifications will be obvious to those skilled in the art.

We claim:

1. An aminomethylenephosphinic acid compound of the formula:

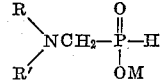

wherein R is selected from the group consisting of hydrogen,

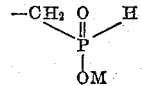

alkyl, phenyl, alkylphenyl, carboxyalkyl, and hydroxyalkyl radicals, and R' is selected from the group consisting of R, lower alkylene-N,R,R', phenylene-N,R,R' radicals and R and R' may be joined with N through a second N in the form of a piperazine residue, and M is selected from the group consisting of hydrogen and alkali and alkaline earth salt forming cations, and wherein each alkyl group contains from 1–18 carbon atoms.

2. N,N,N-tris-(methylenephosphinic acid)-amine.
3. $n$-(Lower alkyl amino)-$n$-(methylenephosphinic acid) wherein $n$ is an integer from 1 to 3.
4. Sodium salt of N,N,N-tris-(methylenephosphinic acid)-amine.
5. Sodium salt of laurylaminomethylenephosphinic acid.
6. Calcium salt of laurylamine-bis-methylenephosphinic acid.
7. Sodium salt of phenylaminomethylenephosphinic acid.
8. Sodium salt of ethylenediamine-tetramethylenephosphinic acid.
9. Aminomethylenephosphinic acid of the formula:

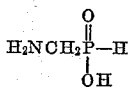

10. Alkylaminomethylenephosphinic acid wherein the alkyl groups contain from 1–18 carbon atoms.
11. Laurylaminomethylenephosphinic acid.
12. Laurylamino-bis-methylenephosphinic acid.
13. Phenyl-aminomethylenephosphinic acid.
14. Ethylenediamine-methylenephosphinic acid.
15. Ethylenediamine-tetramethylenephosphinic acid.
16. Phenylenediamine-tetramethylenephosphinic acid.
17. Piperazine-di-methylenephosphinic acid.

References Cited by the Examiner

UNITED STATES PATENTS

| | | | |
|---|---|---|---|
| 2,227,963 | 1/41 | Dickey et al. | 260—500 |
| 2,228,653 | 1/41 | Ettling et al. | 260—500 |
| 2,328,358 | 8/43 | Pikl | 260—500 |
| 2,346,155 | 4/44 | Condit et al. | 260—500 |
| 2,632,018 | 3/53 | Kosolapoff | 260—500 |

OTHER REFERENCES

Van Wazer: Phosphorus and its Compounds, vol. 1, pp. 370 and 384, Interscience Publishers, Inc., New York (1958).

IRVING MARCUS, *Primary Examiner.*

WALTER A. MODANCE, *Examiner.*